United States Patent

[11] 3,595,335

| [72] | Inventors | Henry W. Wessells, III<br>Paoli;<br>Walter S. Eggert, Jr., Huntingdon Valley,<br>both of, Pa. |
|---|---|---|
| [21] | Appl. No. | 861,096 |
| [22] | Filed | Sept. 25, 1969 |
| [45] | Patented | July 27, 1971 |
| [73] | Assignee | The Budd Company<br>Philadelphia, Pa. |

[54] FRONT END VEHICLE BODY STRUCTURE
4 Claims, 3 Drawing Figs.

[52] U.S. Cl............................................. 180/91,
293/69, 293/71, 296/37.2, 224/42.04
[51] Int. Cl........................................................B60r 19/00
[50] Field of Search............................................ 180/91, 82,
94; 296/37.2; 293/69, 71; 224/42.04, 42.05, 42.06

[56] References Cited
UNITED STATES PATENTS

| 2,547,083 | 4/1951 | Lundgren...................... | 296/37.2 UX |
| 3,047,331 | 7/1962 | Porsche et al. ............... | 180/54.4 |

*Primary Examiner*—Benjamin Hersh
*Assistant Examiner*—John P. Silverstrim
*Attorneys*—Thomas I. Davenport, Edward M. Farrell, John B. Sowell, Alford L. Trueax, Jr. and William R. Nolte ABSTRACT: A safety body structure for the front end of a rear engine mounted vehicle having a kickup device for moving a spare tire from a horizontal stored position to a vertical buffer position during a frontal collision of the vehicle and providing a body structure for progressive yielding during collision.

FRONT END VEHICLE BODY STRUCTURE

This invention relates to a rear engine mounted motor vehicle body and more particularly to the front end structure.

It has been found that in front end collisions of rear engine mounted vehicles, if the spare tire and wheel are mounted in a horizontal position on the front floor pan, the tire and wheel will often be driven through the fire wall into the occupant compartment or into the gasoline tank in the horizontal position. It is an object of this invention to provide a front end body structure for a rear engine mounted vehicle to accommodate a horizontally mounted spare tire and wheel that will be "kicked-up" to a vertical position when the vehicle is involved in a front end collision. Another object of this invention is to provide a front end body structure that will progressively yield during a collision thereby cushioning the occupants of the vehicle from the sudden impact of collision of a more rigid structure.

These and other objects of this invention will be apparent as reference is made to the following specification and drawings wherein.

Figure 1:
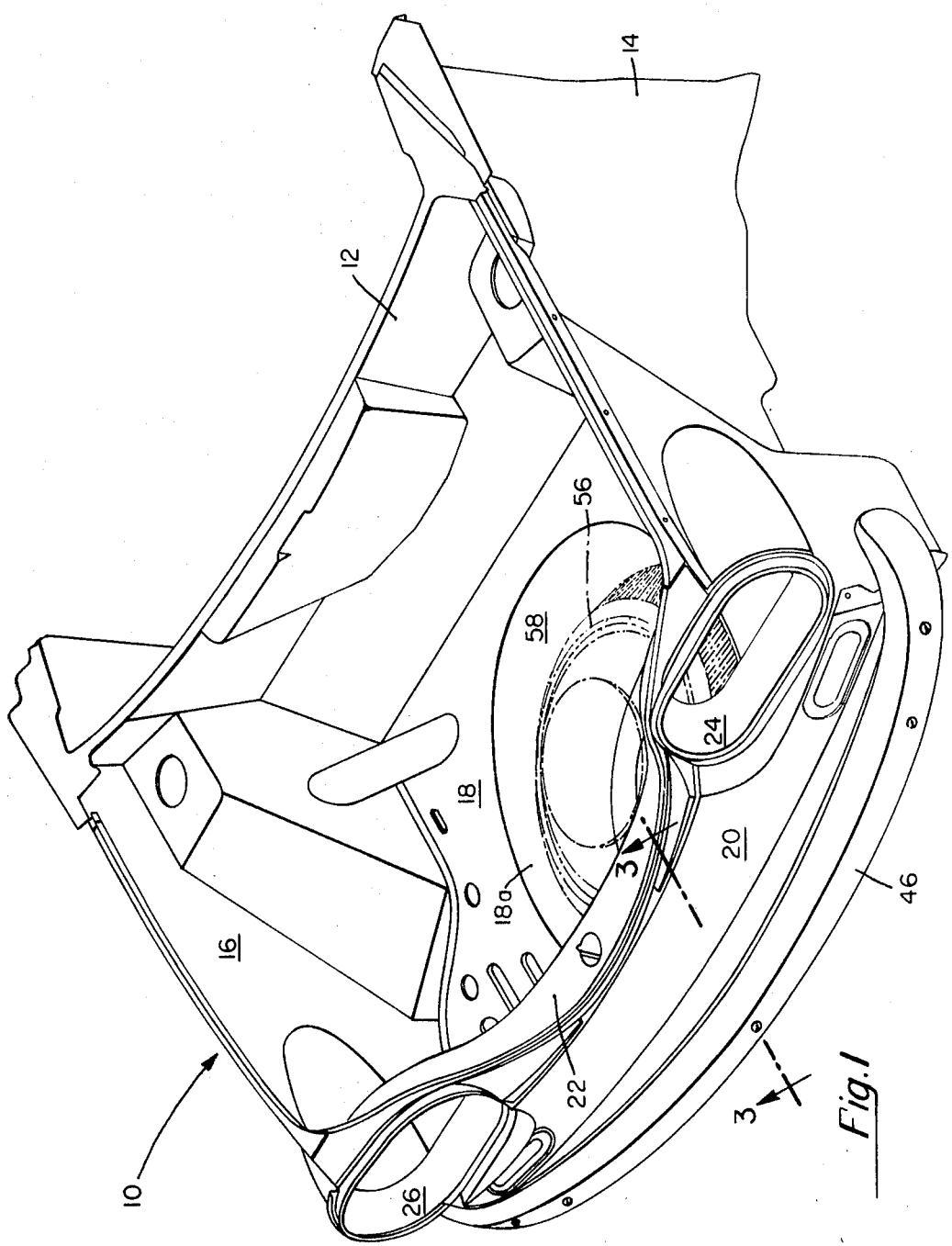
FIG. 1 is a perspective view of the front end of a vehicle body with portions of the outer sheet metal removed to show the novel body structure of this invention.

Referring now to the drawings, as best seen in FIG. 1, a front-end vehicle body structure 10 includes a dash panel 12 extending between and secured to left and right front wheel house panel 14, 16 respectively. A front floor pan 18 having a tire well 18a formed therein with the rear edge of the floor pan secured to the lower edge of the dash panel 12 and the left and right edges secured to the front wheel house panels 14, 16 respectively. A lower front panel 20 extends across the front of the body 10 with each end secured to the respective wheel house panels 14, 16 and the lower portion is secured to the front floor pan 18 and the upper edge is secured to the hood lock reinforcement panel 22. The hood lock reinforcement panel has the respective end portions secured to the wheel house panel 14, 16 and together with the front lower panel 20 and wheel house panels 14, 16 form headlight openings for receiving the left and right headlight housings 24, 26 respectively, secured within the openings.

Figure 2:
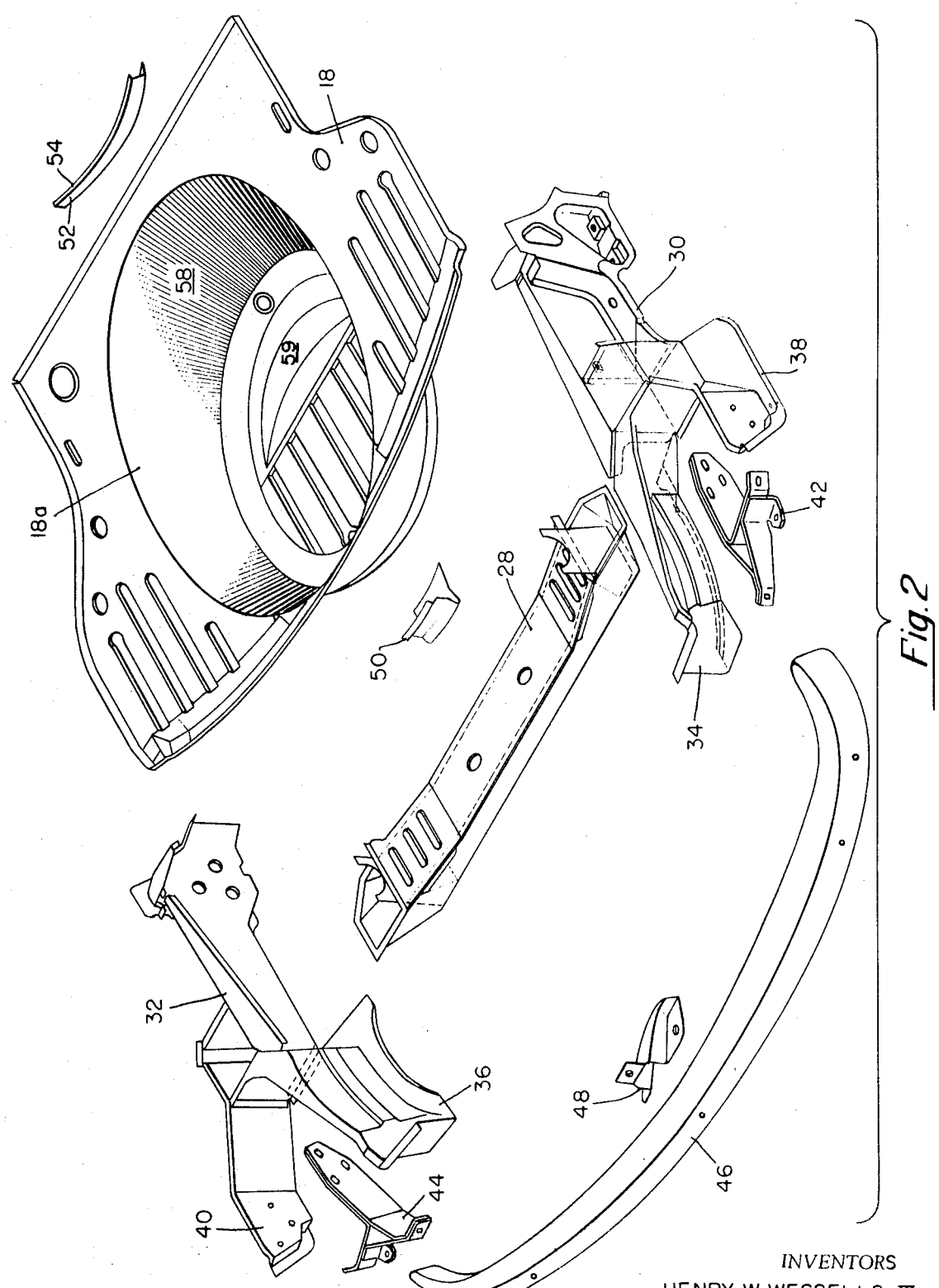
FIG. 2 is an exploded perspective view of the novel front end structure illustrating the individual parts of the under frame and floor pan.

Referring now to FIG. 2, the front under frame includes a forward cross member 28, a left and right front sill 30, 32 secured to the respective ends of the crossmember 28. The rear ends of the front sills 30, 32 are joined to the main under body structure (not shown) and the front ends are divided into inner arms 34, 36, respectively and outer arms 38, 40 respectively. The inner arms 34, 36 are secured to and support the tire well portion 18a of the front floor pan 18. The outer arms 38, 40 are secured to and support the left and right bumper support brackets 42, 44 respectively. The front bumper 46 has its ends attached to and supported by the respective bumper support brackets 42, 44.

Figure 3:
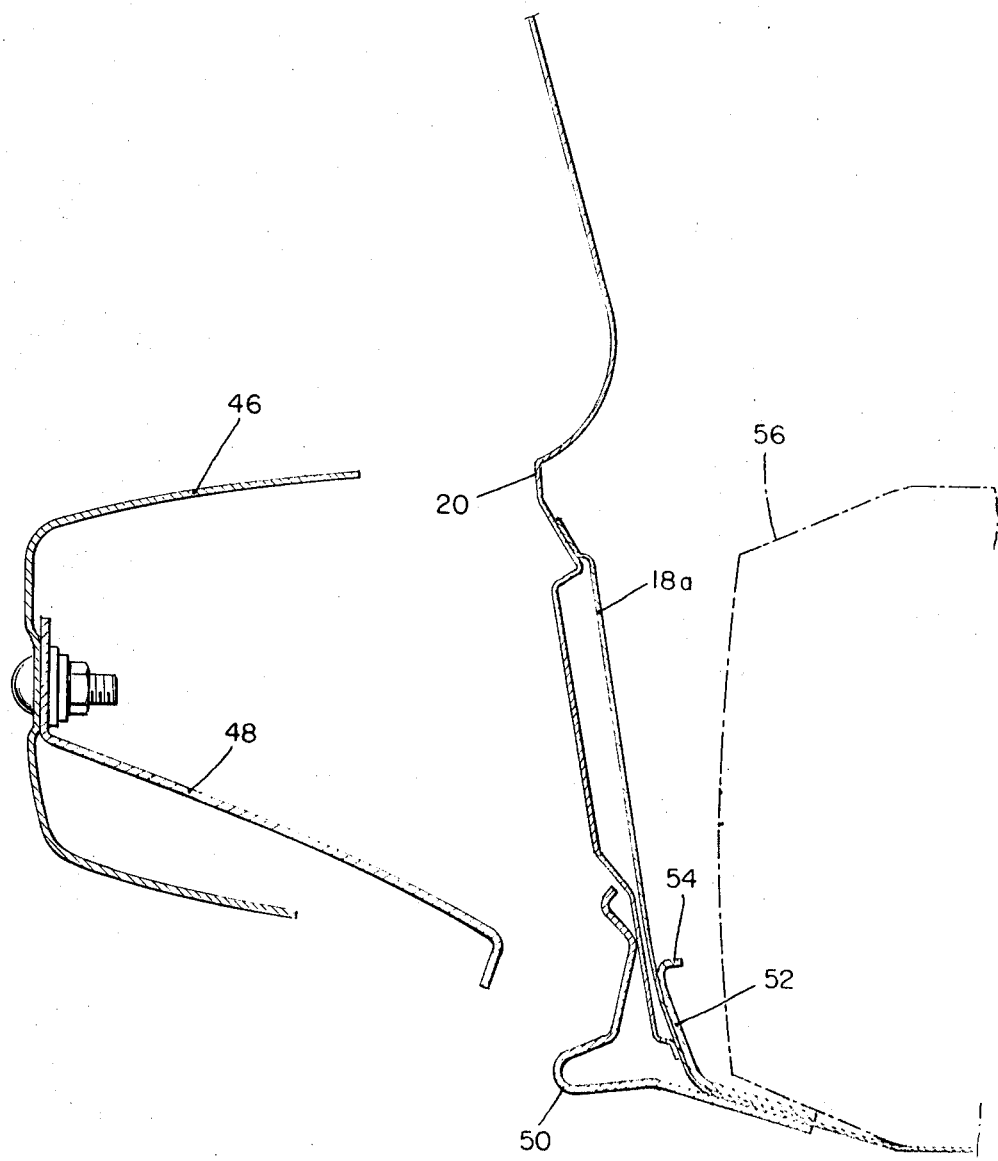
FIG. 3 is a view in the direction of the arrows substantially along line 3–3 of FIG. 1 illustrating the front bumper kicker bracket, front outer panels, outer floor pan reinforcement, floor pan, and inner floor pan reinforcement with the tire shown in phantom.

The tire kickup unit consists of a kicker bracket 48 secured to the inside center of the front bumper 46, as best seen in FIG. 3. An outer tire well reinforcement 50 is aligned with the kicker bracket 48 and secured to the lower outside tire well portion 18a of the floor pan 18. An inner tire well reinforcement 52 is secured to the lower inside of the tire well portion 18a opposite the outer tire well reinforcement 50. A hook 54 extends inwardly from the top of the inner tire well reinforcement 52 for engaging a portion of the tire 56 (shown in phantom lines).

In describing a collision, references to motion are relative to the vehicle body; i.e., in a collision against a fixed object, motion of impacting parts are stopped and the rest of the body continues its forward motion as if the bumper were moved rearwardly relative to the body.

During a collision, the kickup unit would operate in the following manner. On impact the front bumper 46 would yield an move rearwardly. The rearward movement of the bumper carries the kicker bracket 48 into engagement with the outer tire well reinforcement 50 thereby driving it, the tire well wall and the inner tire well reinforcement 52 rearwardly. The rearward movement of the inner tire well reinforcement 52 brings the hook 54 into engagement with the tread on the lower edge of the tire 56 for preventing the kicker slipping off the tire which would reduce the transfer of force. The collision force then drives the tire and wheel assembly rearwardly over the sloping rear wall 58 of the tire well 18a as it rotates the assembly to a vertical position. In this arrangement, the force of impact is applied to the tire and wheel assembly below its center of gravity by the hook 54. The inertia of the tire and wheel assembly is utilized to rotate the assembly to a vertical position as it is moved rearwardly from the point of contact. The sloping surface 58 is provided for clearance as the tire and wheel assembly is rotated to the vertical position. Experimental results show that a horizontally stored tire and wheel assembly will not be rotated upwardly into a vertical position by being driven against a sloped surface such as slope 58, rather, as the tire contacts the sloped surface movement of the tire tends to be retarded or stopped and the body parts to the rear collapse about the assembly. The friction between the tire and the sloped surface tend to maintain the tire nd wheel assembly in a horizontal position, thus preventing kickup. Thus, with this design in a frontal collision, the spare tire and wheel assembly stored in the tire well will not be driven into the passenger compartment horizontally but will be kicked-up to a vertical position adjacent the dash panel and help cushion the occupants from the crash.

The other sheet metal components of the front end structure are designed for progressive yielding during a collision to cushion the passenger from the impact. Assuming the front bumper 46 makes the initial contact and as it yields the bumper support brackets 42, 44 would be forced outwardly and rearwardly and the kicker unit would operate as described above. As the support brackets 42, 44 are moved the outer support arms 38, 40 would be bent outwardly and rearwardly and the inner arms 34, 36 would be bent inwardly and rearwardly. The bending of the arms 34, 36, 38 and 40 would cushion the impact to a greater extent than conventional construction wherein the bumper is generally mounted to the end of the frame and the resistance of the frame to compression is greater than the resistance of the arms to bending so that in bending the energy of impact is dissipated by the bending instead of transmitted along the frame member by its resistance to yielding by compression. By the bending of the sill arms, the wheel house panels and floor pan are deformed, thereby absorbing more of the energy of the impact and further cushioning the passengers.

We claim:

1. In a vehicle having a rear mounted engine and a front trunk space including a generally circular tire well and a spare wheel and tire assembly stored in a horizontal position therein, an impact actuated kickup means for movement of said wheel and tire assembly from a horizontal to a vertical position during a front end collision of said vehicle, and progressively collapsible front end structural means including a bumper for absorption of kinetic energy during a front end collision of said vehicle with another object.

2. In a vehicle having a rear mounted engine and a front trunk space including progressively collapsible front end structural means including a bumper for absorption of kinetic energy during a front end collision of said vehicle with another object and a generally circular tire well and a spare wheel and tire assembly stored in a horizontal position therein, an impact actuated kickup means for movement of said wheel and tire assembly from a horizontal to a vertical position during a front end collision of said vehicle, said kickup means includes a kicker bracket secured to said bumper, an outer tire well reinforcement secured to said tire well and aligned with said kicker bracket for engagement therewith upon movement of said kicker bracket theretoward and an inner tire well reinforcement secured to said tire well adjacent said outer tire well reinforcement, said inner reinforcement having a hook portion extending inwardly from said tire well for engaging and moving said wheel and tire assembly upon movement theretoward of said kicker means during collision of said vehicle.

3. The vehicle body structure as claimed in claim 2 wherein said tire well includes a sloped wall portion opposite said reinforcements for cooperating with said kickup means for providing clearance for the rear of said wheel and tire assembly to rotate upwardly as said wheel and tire assembly are moved and rotated to a vertical position by said kicker means.

4. The vehicle body structure as claimed in claim 1 wherein said front end structural means includes said bumper, a front floor pan and a forward underbody including a right and a left front side sill, a front cross member extending between said front side sills, said front cross member having one end secured to said right side sill and the other end secured to said left side sill, each of said side sills having an outer arm extension and an inner arm extension, said outer extensions supporting the respective ends of said bumper and said inner extensions contacting and supporting the front portion of said front floor pan.